United States Patent
Wu et al.

(10) Patent No.: US 6,851,785 B2
(45) Date of Patent: Feb. 8, 2005

(54) CALIBRATION METHOD AND APPARATUS USING INTERPOLATION

(75) Inventors: Yifeng Wu, Vancouver, WA (US); Philip Cowan, Vancouver, WA (US); Dongli Yang, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/241,729

(22) Filed: Sep. 10, 2002

(65) Prior Publication Data

US 2004/0046820 A1 Mar. 11, 2004

(51) Int. Cl.[7] .............................................. B41J 29/393
(52) U.S. Cl. ................... 347/19; 347/15; 347/5
(58) Field of Search ............................... 347/19, 15, 5; 358/1.9, 80, 501

(56) References Cited

U.S. PATENT DOCUMENTS

| | | | | |
|---|---|---|---|---|
| 5,107,332 | A | * | 4/1992 | Chan ........................... 358/518 |
| 5,508,826 | A | * | 4/1996 | Lloyd et al. ................. 358/501 |
| 6,431,679 | B1 | * | 8/2002 | Li et al. ........................ 347/19 |
| 2002/0126172 | A1 | * | 9/2002 | Akiyama ...................... 347/19 |
| 2003/0058459 | A1 | * | 3/2003 | Wu et al. ..................... 358/1.9 |

* cited by examiner

*Primary Examiner*—Hai Pham
*Assistant Examiner*—Lam Nguyen

(57) ABSTRACT

A systems and method for printer calibration creates linearization tables by receiving optical density related measurements for a primary ink in a group of one or more print heads printing with the primary ink, selecting from the group of print heads at least two print heads that deliver a range of optical densities when printing with the one or more primary ink, generating prebuilt linearization tables corresponding to the at least two print heads that compensate for different ink drop weights printed by the at least two print heads, and providing the prebuilt linearization tables and at least a portion of the optical density related measurements to a calibration routine that interpolates the prebuilt linearization tables to create an actual linearization table for the primary ink printed by a print head. The prebuilt linearization tables and measurements related to optical density calibrate a primary ink printed by a print head, by receiving two or more prebuilt linearization tables for a corresponding two or more print heads that compensate for different ink drop weights printed by the two or more print heads, determining a measurement related to optical density when the print head prints the primary ink at a selected gray level, comparing the measurement related to optical density produced by the print head with measurements related to optical density when the two or more print heads print the primary ink at the selected gray level, and estimating the linearization table for the primary ink based upon the prebuilt linearization tables for the two or more print heads and the comparison of the measurement related to optical density of the print head and the two or more print heads.

29 Claims, 9 Drawing Sheets

CALIBRATION METHOD AND APPARATUS USING INTERPOLATION

BACKGROUND

Printer calibration has become an important topic as print resolution and color reproduction improve in printers. Color calibration compensates for color inconsistency due to manufacturing variations in ink drop weight, ink chemistry and the environmental effects of temperature and humidity on the printing process. For example, ink drop weight produced by different print heads often varies as a result of minute manufacturing differences in the size of the nozzles used in an inkjet print head, different resistor characteristics in the heater element used to eject the ink droplets in the inkjet print head, variations in the orifice shape, or any other difference from one print head to another. Differences in the ink chemistry combined with temperature and humidity also affects the final color appearance when applied to a print medium. To accommodate these factors, color calibration modifies the number of ink drops during printing to make color printing more consistent.

Techniques for color calibration may be time consuming. In some techniques, a non-trivial number of printer test patches are printed in the primary ink or color being calibrated in the print head. For a four color pen, producing a test ramp can include at least 17 patches for each pen having an increment in gray level of 16 units between each of the gradients or a total of 68 patches.

If the printer mechanism is able to conduct the print medium forward and then in reverse, the different patches are printed and then reversed for measurement by the embedded sensor on the printer. However, if the printer does not have a paper reverse feature, each portion of the test patch may be printed swath by swath and then allowed to dry prior to taking sensor measurements. This can take a non-negligible time as a four-color pen involves printing 17 patches for 4 different colors, or a total of 68 patches. For print heads using a greater number of pens, an even longer time period may be involved as significantly more patches must be printed. For example, a six-color pen (i.e., CcMmYK) involves printing 17 patches for each of the 6 colors for a total of 102 patches.

Even when the patches are printed, an additional time delay is incurred as they are scanned and processed. An embedded sensor built into the printer and mounted by the print head takes time to scan the patches and detect the optical density of the ink printed. Of course, some people will not run these calibration routines as the time delay for printing, sensing, and processing the numerous patches is significant. Accordingly, these printers will not be properly calibrated and will produce inconsistent colors and less-than optimal print results.

DETAILED DESCRIPTION

Aspects of the present invention provide one or more of the following advantages used in calibrating color printing system. First, calibration can be done more rapidly using implementations of the present invention by printing and measuring a single patch rather than a ramp of gray levels. This single patch facilitates rapid and accurate color calibration without special hardware or increased costs. Further, printers do not need to conduct paper backward to print different patches as only a single patch of the primary ink may be printed. This makes a calibration using implementations of the present invention more time and cost-effective while maintaining compatibility with a wide range of printers.

Figure 1:
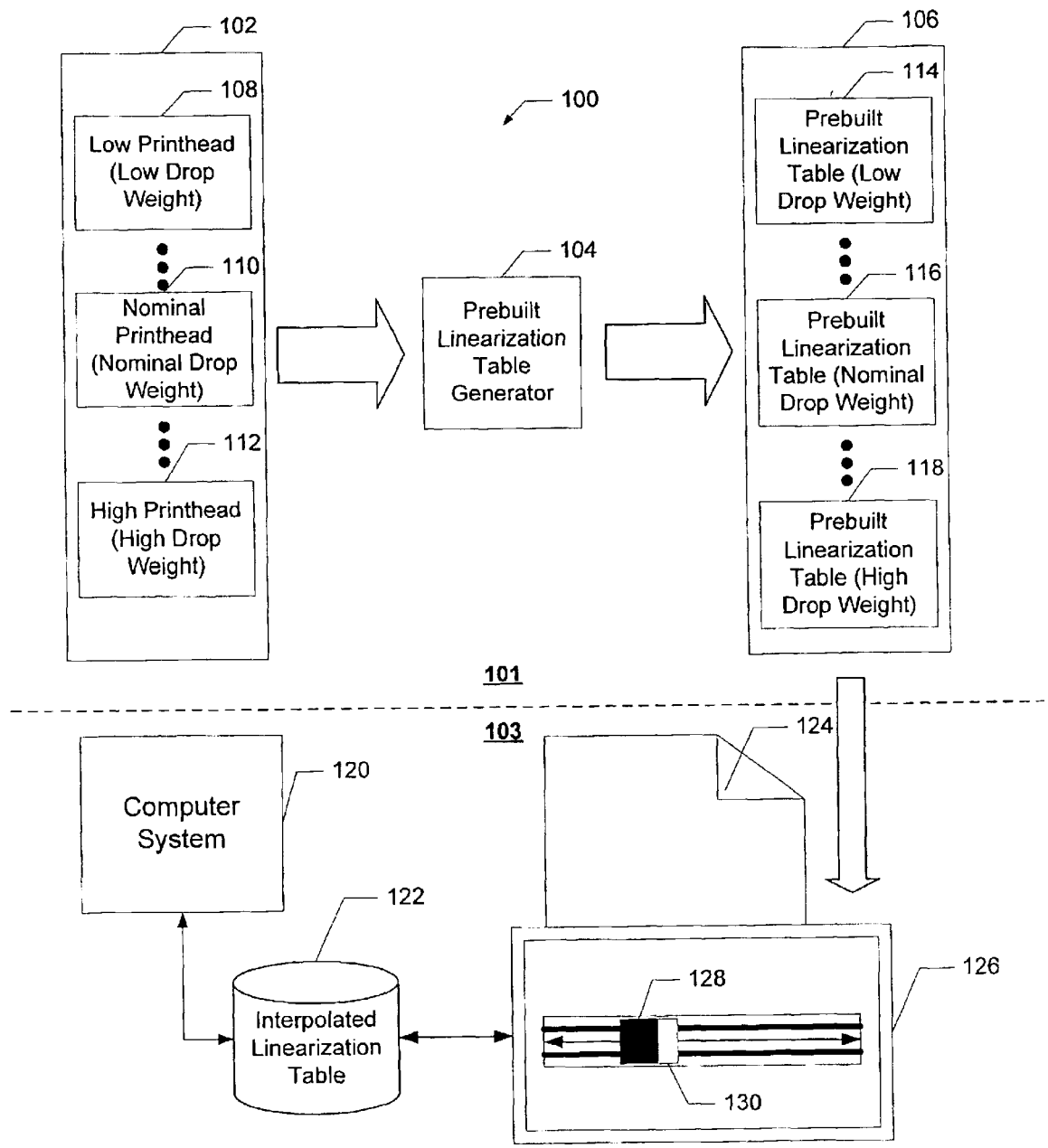
FIG. 1 is a block diagram of a printer calibration system designed in accordance with one implementation of the present invention.

FIG. 1 is a block diagram of a printer calibration system designed in accordance with one implementation of the present invention. System 100 in FIG. 1 illustrates an offline portion 101 that operates prior to calibrating the printer and an online portion 103 used when a print head and printer combination is calibrated. For example, offline portion 101 includes operations and systems typically used by implementations of the present invention during manufacture or design. Online portion 103 includes operations performed subsequently when a printer calibration is requested.

Offline portion 101 in FIG. 1 includes a group of print heads 102, a prebuilt linearization table generator 104, and prebuilt linearization tables 106. Group of print heads 102 includes a representative set of print heads that print different ink drop weights ranging from an inkjet print head with a low drop weight 108 (i.e., low print head 108), an inkjet print head with a nominal drop weight 110 (i.e., nominal print head 110), and an inkjet print head with a high drop weight 112 (high print head 112). Each print head in group of print heads 102 may be individually mounted, operated and measured.

Inherent manufacturing imperfections and environmental conditions can affect the accuracy and consistency of printing within the same model or make of print heads. For example, variations in the nozzle used to deliver ink can produce ink drops of different size and weight. Variations in temperature, humidity, and ink chemistry or composition can also play a role in print results and characteristics. To accommodate for those variables, one implementation of the present invention selects low print head 108, nominal print head 110, and high print head 112. Each print head is operated and measured in accordance with implementations of the present invention. Linearization table generator 104 creates a number of prebuilt linearization tables from the results of these measurements. In the particular implementation described, prebuilt linearization tables 106 include a prebuilt linearization table 114 (low drop weight), a prebuilt linearization table 116 (nominal drop weight), and a prebuilt linearization table 118 (high drop weight). For increased accuracy, alternate implementations can use a greater number of print heads from group of print heads 102 and create a correspondingly greater number of prebuilt linearization tables in prebuilt linearization tables 106.

Prebuilt linearization tables 106 created in offline portion 101 are used in online portion 103 when printer calibration is requested or desired. Online portion 103 in this example includes a computer system 120, an interpolated linearization table 122, a printer 126 having a print head 128 and a sensor 130, and a medium 124 for printing. As illustrated, interpolated linearization table 122 can be accessed by either computer system 120 or printer 126. Alternatively, interpolated linearization table 122 can be stored directly on either computer system 120 or printer 126 depending on the design requirements. Similarly, prebuilt linearization tables 106 from offline portion 101 can be stored in memory on printer 126 or computer system 120. Further, a calibration routine designed in accordance with implementations of the present invention can be executed on a processor within computer system 120, printer 126 or a combination thereof In operation, printer 126 prints a test patch in a primary ink using print head 128 and then uses sensor 130 to measure the ink drop weight printed on medium 124 in terms of L* in the CIE L*a*b* color space. L* is a term that measures the luminosity and is sometimes considered a measure of "brightness." Sensor 130 may be an embedded light sensor in printer 126. The L* measurement made by sensor 130 is plotted against a series of gray levels and compared with L* measurement for low print head 108, nominal print head 110, and high print head 112 respectively to identify an interpolation factor. This interpolation factor is used to interpolate between selected prebuilt linearization tables 106 in accordance with implementations of the present invention and produce a linearization table for a primary ink being printed. In general, the role of a linearization table is to receive an input gray level for printing a primary ink and provide a compensated output gray level calculated to print with a substantially straight-line relationship of L* to the input gray level.

Figure 2:
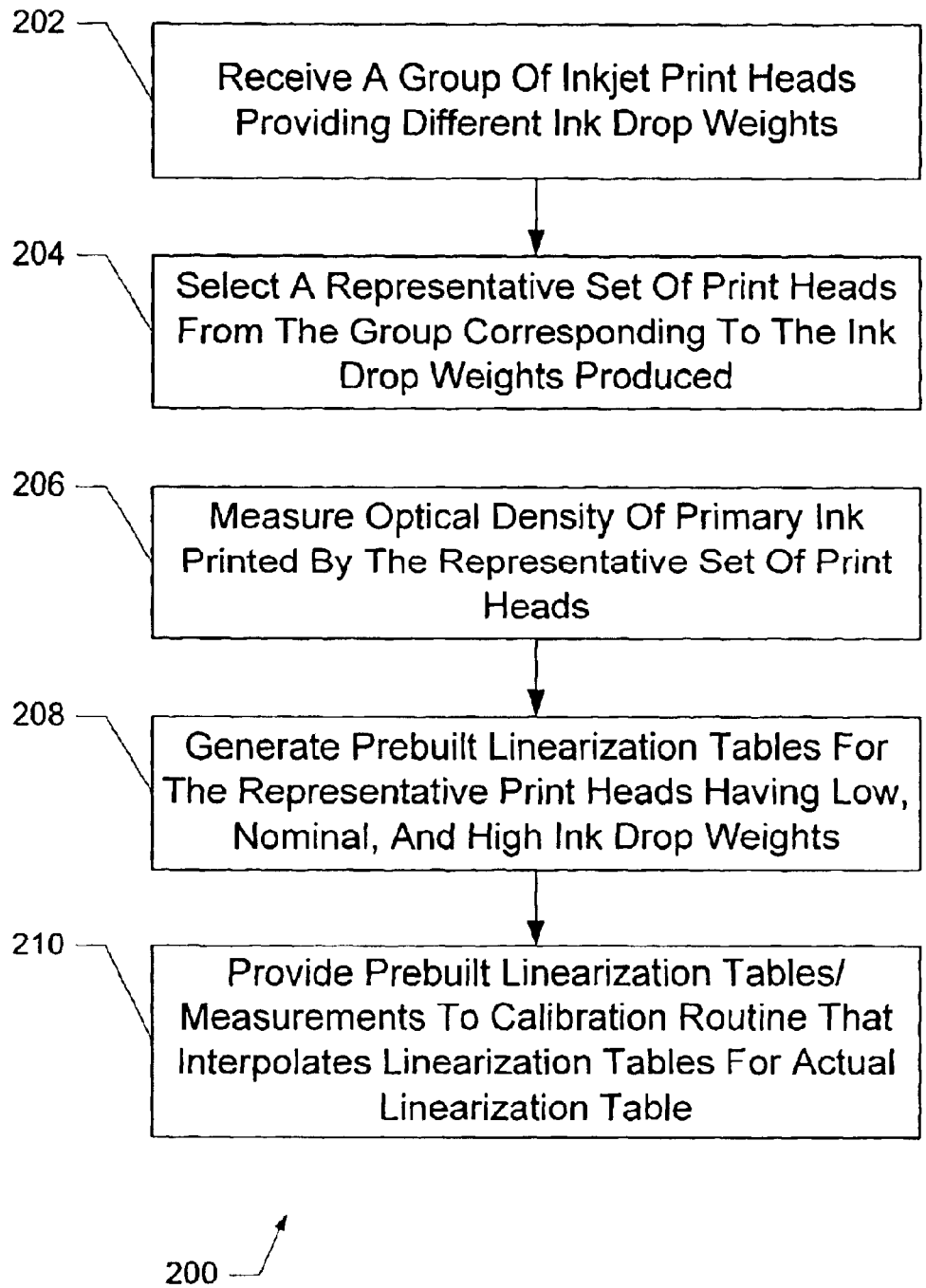
FIG. 2 is a flow chart diagram of the operations to create prebuilt linearization tables in accordance with one implementation of the present invention.

FIG. 2 is a flow chart diagram of the operations for creating prebuilt linearization tables in accordance with one implementation of the present invention. Initially, a group of inkjet print heads are manufactured providing different ink drop weights (202). These different ink drop weights can be attributed to manufacturing differences in the printer components. The print heads are generally manufactured within a tolerance that can be calibrated in accordance with implementations of the present invention.

From the group of inkjet print heads, a representative set of print heads are selected and categorized based on the different ink drop weights they produce (204). In one implementation, three print heads are selected representing a low ink drop weight (hereinafter, a low print head), a nominal ink drop weight (hereinafter, a nominal print head), and a print head producing a high ink drop weight (hereinafter, a high print head) for one or more primary inks. In an alternate implementation, more than three print heads can also be used in the representative set of print heads. The number of print heads selected may depend on the costs for producing the calibration system and the accuracy required when calibrating the primary inks. For example, using more print heads increases the costs and processing time required to perform the calibration but increases the accuracy of the calibration process in accordance with the present invention. A two print head system could also be configured to save on costs but would most likely produce a less accurate calibration.

A measurement device measures one or more print samples from each of the representative print heads and determines values related to the optical density of the primary inks when they are printed (206). The print samples are created by first printing a test ramp for each primary ink. For example, a primary ink would be printed as a gradient of 17 patches. Accordingly, a four ink CMYK (i.e., cyan, magenta, yellow, black) color printer would involve the printing of 68 color patches and a six ink CcMmYK (i.e., cyan, light-cyan, magenta, light-magenta, yellow, black) color printer would require 102 color patches. This test ramp for the primary ink is measured using a spectrophotometer, densitometer, or other accurate measuring device.

The measurement information associated with each of the representative print heads and primary inks is used to create corresponding prebuilt linearization tables (208). Generally, these prebuilt linearization tables are generated once for each print head design and capture the typical range of variation in the print head operation and performance. Alternatively, the prebuilt linearization tables can be created offline at specific time intervals or recreated for each new lot of print heads manufactured. If the print heads in different manufacturing lots vary, recreating the prebuilt linearization tables for different manufacturing lots would likely improve overall calibration accuracy.

Once the prebuilt linearization tables are created, they are provided along with the supporting measurements to a calibration routine also designed in accordance with implementations of the present invention where they are interpolated to determine the actual linearization tables for the primary inks being calibrated (210). By creating several prebuilt linearization tables, primary inks from a print head are calibrated online without printing a large number of test patches or performing the corresponding complex measurements. Estimating the actual linearization table using interpolation in accordance with the present invention provides the accuracy necessary for calibration yet eliminates printing and measuring a large number of test patches.

Figure 3:
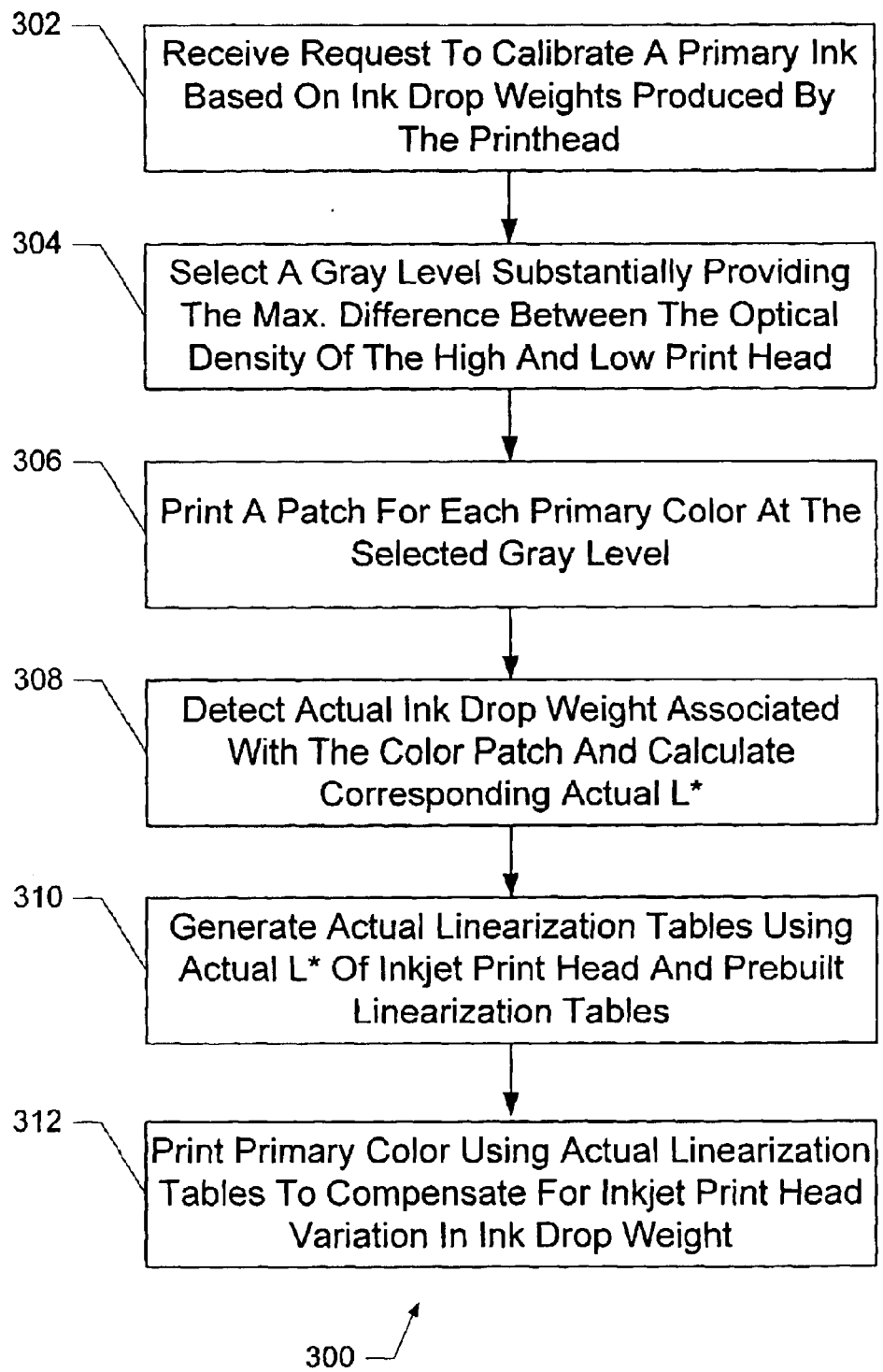
FIG. 3 is a flow chart diagram of the operations associated with performing a printer calibration in accordance with one implementation of the present invention.

FIG. 3 is a flow chart diagram of the operations associated with performing a printer calibration in accordance with one implementation of the present invention. The request to calibrate the primary ink typically occurs when a printer is first used, a new print head is installed, or the occurrence of other events that may affect the amount of ink delivered by the print head (302). For example, a printer calibration may be helpful after a printer has been jarred during shipping and/or delivery. The calibration may also be useful to perform periodically as a print head ages and the ink ejection characteristics of the print head changes. Further, implementations of the present invention addressing calibration issues in the printer can also be part of a larger set of routines used to calibrate other aspects of the printer or perform setup operations on the particular printer.

The calibration operation of implementations of the present invention selects a gray level that corresponds substantially to a gray level at which there is a maximum difference between the optical density of the high and low print head (304). This difference in optical density is determined by comparing L* measurement for the high print head and the low print head at various gray levels. By selecting the gray level providing this maximum difference, the dynamic range being measured is increased and errors caused by inaccuracies of the embedded sensor are reduced. The value of L* at this selected gray level for the low print head is referred to as prebuilt L* low and for the high print head is referred to as prebuilt L* high. For the nominal print head, the value of L* at the selected gray level is referred to as prebuilt L* nominal. These values are used later herein for determining an actual linearization table for the primary ink being calibrated and are also further described with reference to the linearization tables in FIG. 7.

Accordingly, one implementation of the present invention prints a test patch for each primary ink at the selected gray level described above (306). One test patch may be printed for each primary ink to perform a calibration in accordance with implementations of the present invention instead of multiple gradient patches of the primary ink. Reducing the number or patches to be printed and measured saves a great deal of time and resources as far fewer test patches are being processed by the calibration operation.

An embedded sensor associated with the printer detects and measures the test patch printed for each of the primary inks (308). An actual L* is calculated based on the measurements made by the embedded sensor processed using a predefined conversion formula. Alternate terms other than L* can be used to represent optical density of a primary ink. For example, yellow can be represented using the b* term in the CIE L*a*b* colorspace to accommodate for the relatively lower dynamic range of L* associated with the color yellow.

The calibration uses the prebuilt linearization tables to create actual linearization tables based on actual L* and prebuilt L* measurements for each primary ink (310). Prebuilt L* measurements are the L* measurements made on the low print head, nominal print head, and high print head at the selected gray level identified as prebuilt L* low, prebuilt L* nominal, prebuilt high L* high and used to generate corresponding prebuilt linearization tables. A comparison between the actual L* for the primary ink being calibrated and the prebuilt L* measurements determines whether one of the prebuilt linearization tables is used directly or two are interpolated to produce the appropriate actual linearization table for the primary ink being calibrated. The resulting actual linearization table is used to print a primary ink and compensate for variations in optical density (312).

Figure 4:
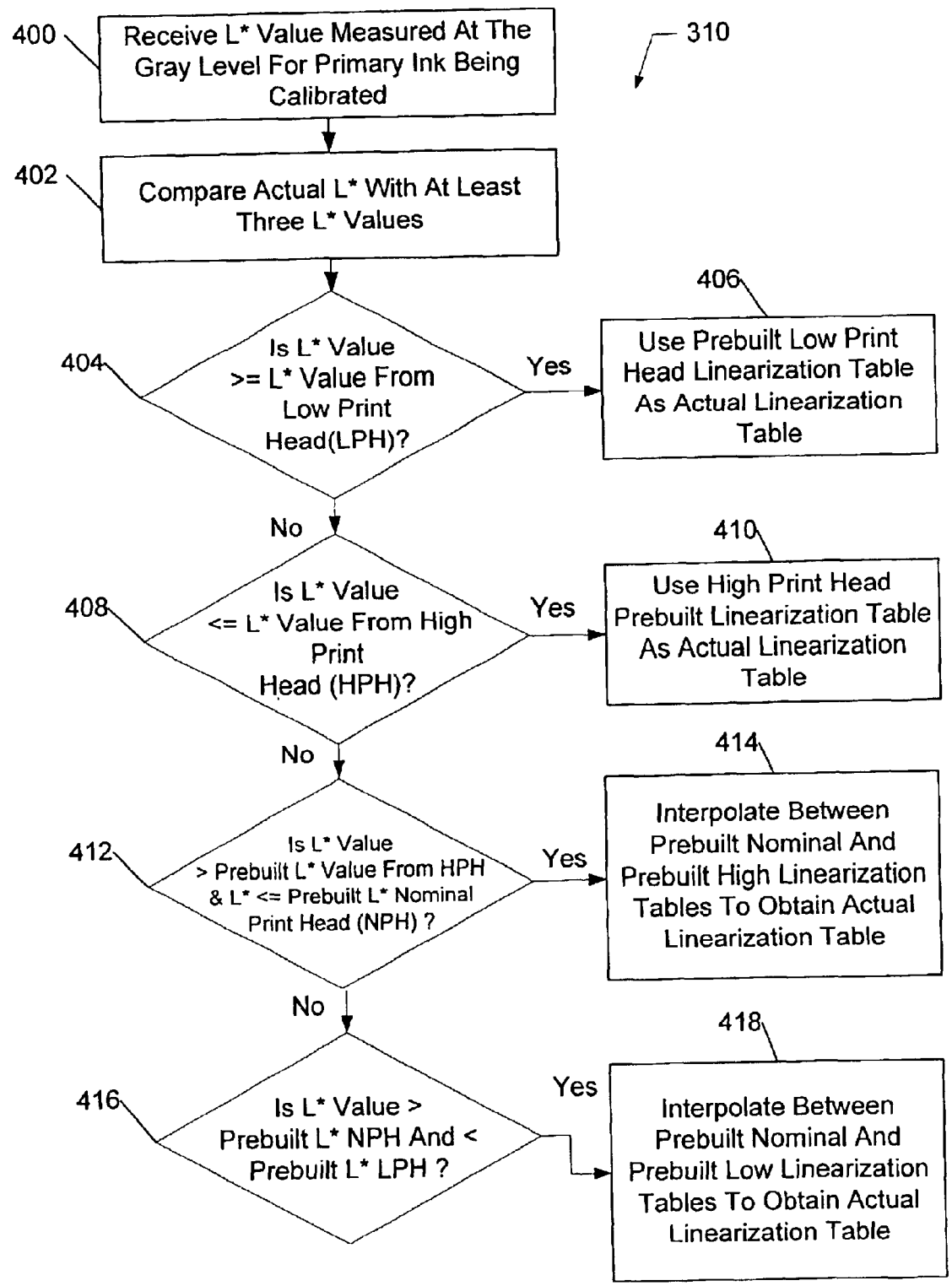
FIG. 4 is a flow chart diagram to generate an actual linearization table for a primary ink in accordance with one implementation of the present invention.

FIG. 4 is a flow chart diagram of the operations for generating the actual linearization table for a primary ink in accordance with one implementation of the present invention. The L* is measured for the primary ink being calibrated when it is printed at the selected gray level (400). As previously described, the gray level is selected to substantially correspond to a gray value at which there is a maximum difference in the L* measurements made when the low and high print head each print a ramp of test patches. In one implementation, the actual L* for the primary ink being calibrated is compared with three prebuilt L* measurements for the primary ink printed by the corresponding low, nominal, and high print head (402). Alternate implementations of the present invention use greater than three different print heads and prebuilt L* measurements depending on the desired balance between processing costs and accuracy in generating the linearization tables.

When L* is equal or greater than prebuilt L* from the low print head (404), implementations of the present invention use the low print head prebuilt linearization table for the actual linearization table of the print head being calibrated (406). As an alternative, when L* is greater than prebuilt L* from the low print head, the actual linearization table can be determined by interpolating between the prebuilt L* from the nominal print head and the prebuilt L* from the low print head.

Alternatively, when L* is equal to or less than prebuilt L* from the high print head (408), implementations of the present invention may use the high print head prebuilt linearization table as the actual linearization table for the print head being calibrated (410). Also as an alternative, when L* is less than prebuilt L* of the high print head, the actual linearization table can be determined by interpolating between the prebuilt L* from the nominal print head and the prebuilt L* from the low print head.

Implementations of the present invention interpolate when L* of the primary ink being calibrated is between prebuilt L* from the nominal print head and prebuilt L* from the high print head (412). Specifically, implementations of the present invention interpolate between the nominal and high prebuilt linearization tables when L* is greater than prebuilt L* of the high print head (prebuilt L* high) yet less than prebuilt L* of the nominal print head (prebuilt L* nominal). In this example, the interpolation operation determines an interpolation factor F where F=(L*−prebuilt L*high)/(prebuilt L*nominal−prebuilt L*high) and L*, prebuilt L*high, and prebuilt L* nominal are measured at the gray level as selected above. This interpolation factor is used to generate an actual linearization table T, where T=High prebuilt linearization table+F*(Nominal prebuilt linearization table−High prebuilt linearization table) (414). High prebuilt linearization table and nominal prebuilt linearization table are the prebuilt linearization tables corresponding to the high print head and nominal print head respectively.

Further, implementations of the present invention also interpolate when L* of the print head being calibrated is greater than prebuilt L* of the nominal print head and less than prebuilt L* of the low print head measurements (416). When this occurs, the interpolation operation determines an interpolation factor F where F=(L*−prebuilt L*nominal)/(prebuilt L*low−prebuilt L*nominal) and L*, prebuilt L*nominal, and prebuilt L* low are also measured at the gray level as selected above. This interpolation factor is used to generate an actual linearization table T, where T=Nominal prebuilt linearization table+F* (Low prebuilt linearization table−Nominal prebuilt linearization table) (418).

Figure 5A:
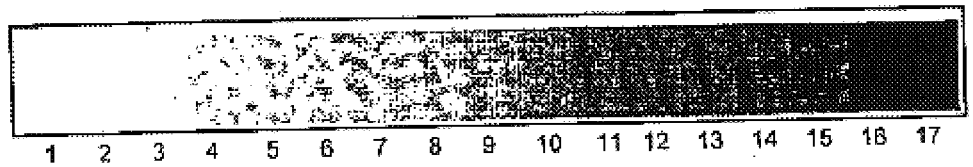
FIG. 5A depicts a ramp of test patches used for measuring a primary ink in accordance with one implementation of the present invention.

FIG. 5A depicts a test ramp used for measuring a primary ink for a prebuilt linearization table in accordance with one implementation of the present invention. In this example, 17 different patches in the test ramp are measured and used to create a prebuilt linearization table useful when calibrating a primary ink.

Figure 5B:
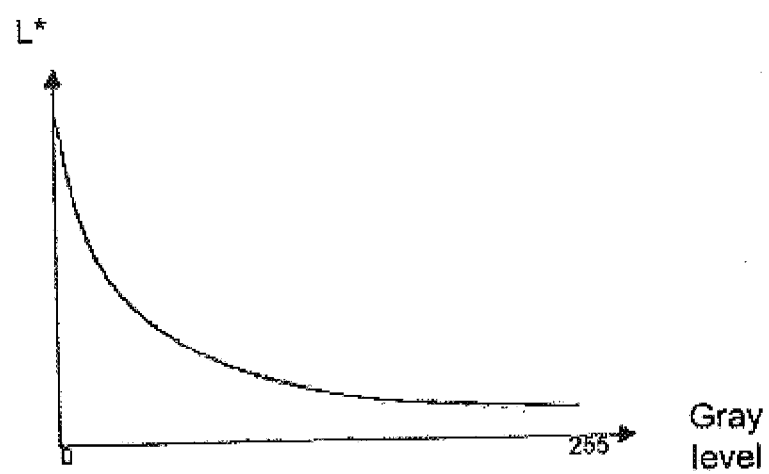
FIG. 5B is a graph depicting the relationship between gray levels and the measured L* values for a primary ink in accordance with one implementation of the present invention.

FIG. 5B is a graph depicting the relationship between the input gray levels and L* measurements for a primary ink. Essentially, as the gray levels increase from 0 to 255, the L* value decreases as illustrated in FIG. 5B. This graph in FIG. 5B reflects that the luminosity represented by L* decreases as the gray levels increase along a gradient.

Figure 6:
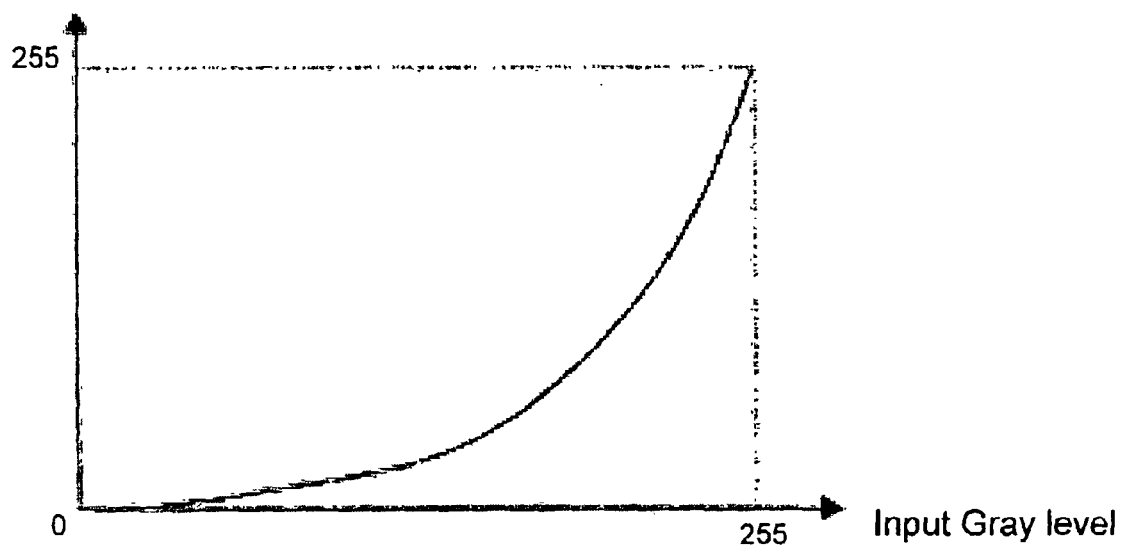
FIG. 6 is another graph depicting an example prebuilt linearization table used in one implementation of the present invention.

FIG. 6 is another graph depicting a sample prebuilt linearization table used in one implementation of the present invention. The prebuilt linearization table may be generated once for each primary ink. Although changes in the ink ejection characteristics of the print head may make it desirable to subsequently generate prebuilt linearization tables. Several prebuilt linearization tables are created to represent the different optical density produced by low, nominal, and high print heads. For example, a 4 color print head (i.e., CMYK) could have 3 prebuilt linearization tables for each of the primary colors and a total of 12 prebuilt linearization tables. Instead of one prebuilt linearization table, for each primary ink, the 3 prebuilt linearization tables corresponding to a low print head, a nominal print head, and a high print head are used in accordance with one implementation of the present invention.

Figure 7:
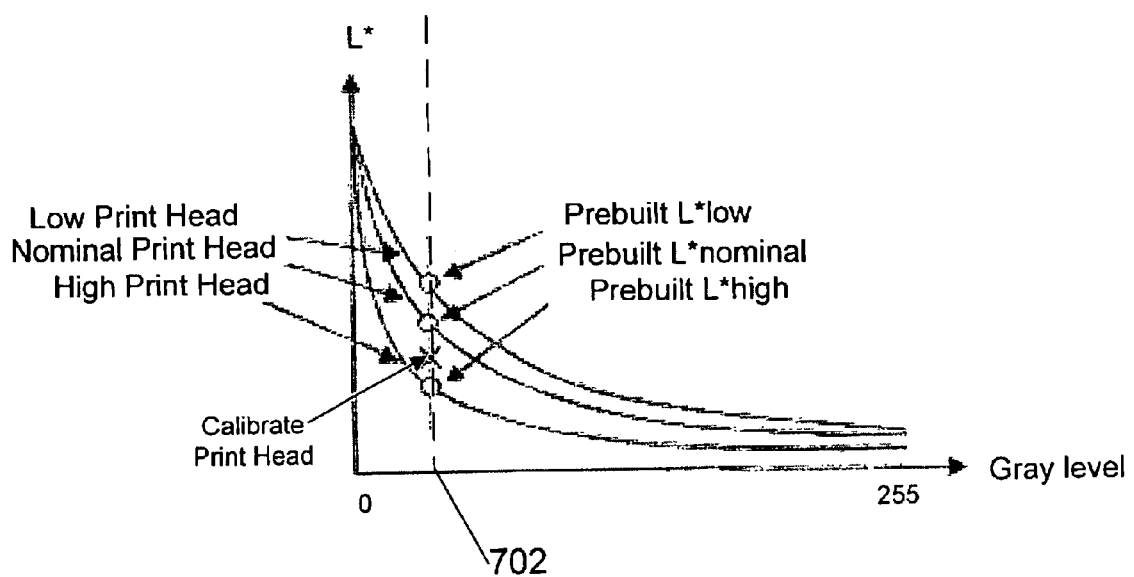
FIG. 7 is a graph used to identify an interpolation factor from several curves measuring L* for different ink drop weight pens.

FIG. 7 is a graph of prebuilt L* measurements for a low, nominal, and high print head for calibrating a primary ink. A gray level 702 marks the point where the difference between prebuilt L* for the low and high print heads is the maximum. The L* measurement of the primary ink being calibrated at gray level 702 is indicated by the "X" in FIG. 7 and useful when calculating the interpolation factor and determining how to interpolate the linearization tables. Prebuilt L*low, prebuilt L*nominal, and prebuilt L* high are also used at this gray level for calculating the interpolation factor.

Figure 8:
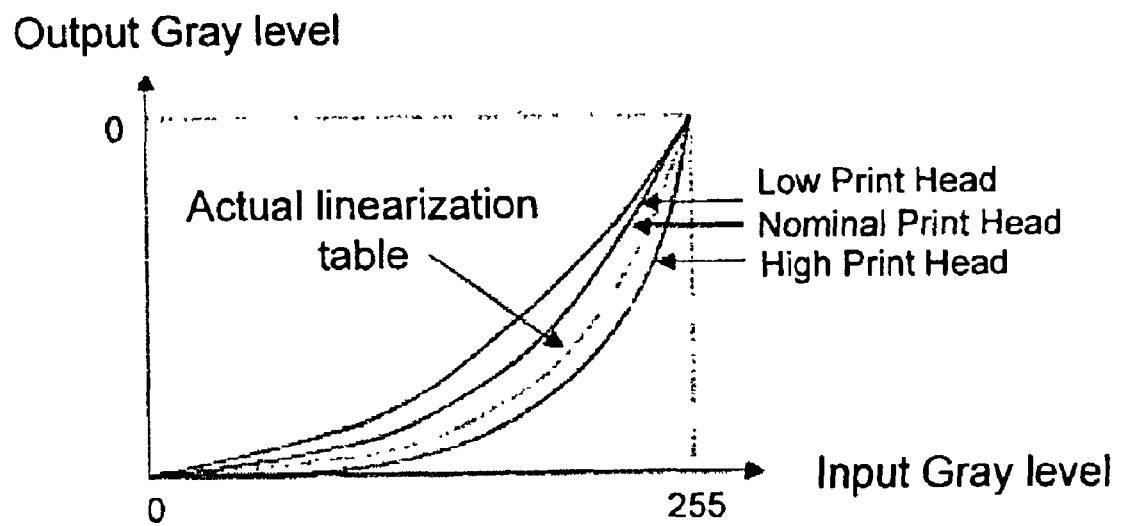
FIG. 8 is another graph depicting several prebuilt linearization tables and an actual linearization table in accordance with one implementation of the present invention.

FIG. 8 is a graph depicting several prebuilt linearization tables and an actual linearization table in accordance with one implementation of the present invention. The prebuilt linearization tables identified as low print head, nominal print head, and high print head correspond to the optical density measured for these different print heads. The actual linearization table is indicated in the broken or dotted line and is generated by interpolation in accordance with the present invention as described above.

Figure 9:
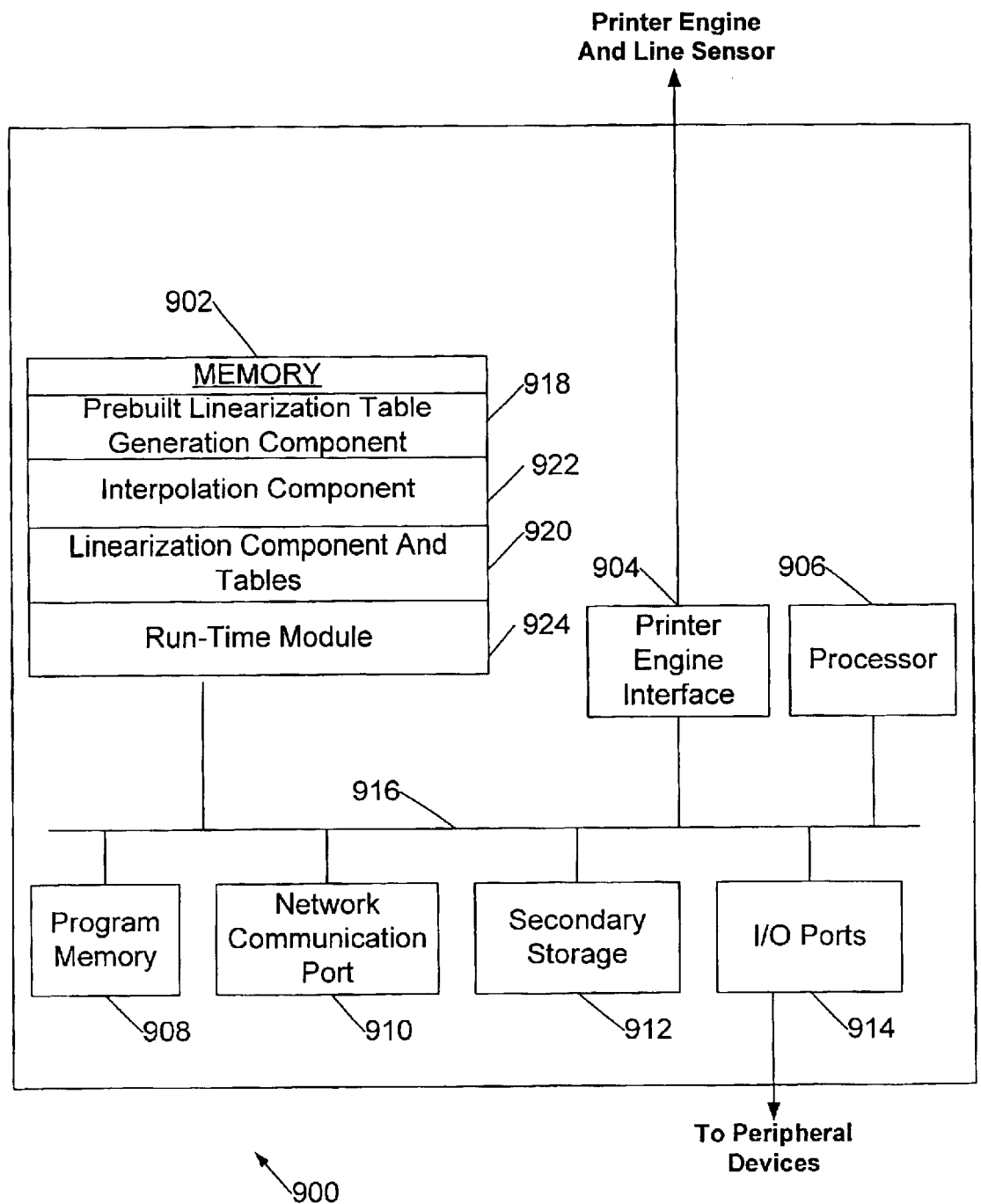
FIG. 9 is a block diagram of a system used by one implementation of the present invention for calibrating a primary ink used by a printer.

FIG. 9 is a block diagram of a system used by one implementation of the present invention for calibrating a primary ink and printer combination. In this example, system 900 includes a memory 902, typically random access memory (RAM), a printer engine interface 904, a processor 906, a program memory 908 (for example, a programmable read-only memory (ROM) such as a flash ROM), a network communication port 910, a secondary storage 912, and I/O ports 914 operatively coupled together over bus 916. System 900 can be preprogrammed, in ROM, for example, or it can be programmed (and reprogrammed) by loading a program from another source (for example, from a floppy disk, a CD-ROM, or another computer).

Once initialized, memory 902 may include one or more aspects of the present invention. For example, prebuilt linearization table generator 918 can be included in memory without the other components. This prebuilt linearization generator 918 is typically used offline to generate prebuilt linearization tables and measurements at manufacturing works alone while 922 and 920 work together. Interpolation Component 922 facilitates measuring a test patch and interpolating the prebuilt linearization tables to create an actual linearization table for a primary ink in a printer and print head combination. Linearization component and tables 920 performs the linearization and color compensation during printing to enhance the printing through improved color consistency and accuracy and run-time module 924 manages allocation of resources on system 900 while performing the one or more operations described above.

While specific embodiments have been described herein for purposes of illustration, various modifications may be made without departing from the spirit and scope of the invention. For example, not only can the present invention be used to generate linearization tables and calibrate a primary ink for an inkjet but similar principles and teachings can also be applied in other print technologies including electrophotograhic (EP) or laserjet technologies. Laser technologies would adjust the amount of toner to be used when printing rather than the amount of ink being applied to a print medium. Analogous calibrations would be applied to a laser discharge device and photoconductor drum rather than a primary ink from a print head or pen used in inkjet technologies. Further, methods and systems of the present invention can be used in both thermal and piezoelectric print head technologies and should not be limited to only one of these inkjet technologies. Also, in addition to a CMYK printer, implementations of the present invention can also work for printers having greater or fewer primary inks or colors. For example, implementations of the present invention could also be implemented using a 6 ink printer CcMmYK or a black-and-white printer. Accordingly, the invention is not limited to the above-described implementations, but instead is defined by the appended claims in light of their full scope of equivalents.

What is claimed is:

1. A method of creating linearization tables used in printer calibration comprising:

receiving optical density related measurements for a primary ink in a group of one or more print heads printing with the primary ink;

selecting from the group of print heads at least two print heads that deliver a range of optical densities when printing with the one or more primary ink;

generating prebuilt linearization tables corresponding to the at least two print heads that compensate for different ink drop weights printed by the at least two print heads; and providing the prebuilt linearization tables and at least a portion of the optical density related measurements to a calibration routine that interpolates the prebuilt linearization tables to create an actual linearization table for the primary ink printed by a print head.

2. The method of claim 1 wherein receiving the optical density related measurements for the primary ink further comprises:

printing a ramp on a print medium with the primary ink that represents an increasing range of optical density of the primary ink; and measuring the ramp on the print medium to determine the optical density related measurements of the primary ink produced by the at least two print heads.

3. The method of claim 1 wherein the print heads use a print technology selected from a set including: thermal inkjet, piezoelectric inkjet, and electro photographic.

4. The method of claim 1 wherein the at least two print heads selected from the group of print heads are identified as printing low, nominal, and high ink drop weights.

5. The method of claim 1 wherein the primary ink is selected from a set of primary inks including: cyan, light-cyan, magenta, light-magenta, yellow, and black inks.

6. The method of claim 1 wherein the prebuilt linearization tables receive an input gray level for the primary ink and provides a compensated output gray level to allow printing with a substantially straight-line relationship of the optical density related measurements to the input gray level.

7. The method of claim 6 wherein the optical density related measurements include measurements of L* in the L*a*b* color space.

8. The method of claim 6 wherein the optical density related measurements include measurements of b* in the L*a*b* color space.

9. A method of calibrating a primary ink printed by a print head, comprising:

receiving two or more prebuilt linearization tables for a corresponding two or more print heads that compensate for different ink drop weights printed by the two or more print heads;

determining a measurement related to optical density when the print head prints the primary ink at a selected gray level;

comparing the measurement related to optical density produced by the print head with measurements related to optical density when the two or more print heads print the primary ink at the selected gray level; and estimating a linearization table for the primary ink based upon the prebuilt linearization tables for the two or more print heads and the comparison of the measurement related to optical density of the print head and the two or more print heads.

10. The method of claim 9 wherein the two or more prebuilt linearization tables include linearization tables corresponding to a low ink drop weight print head, a nominal ink drop weight print head, and a high ink drop weight print head.

11. The method of claim 10 wherein the selected gray level corresponds to a gray level that the two or more print heads that print the primary ink at substantially a maximum difference in L*.

12. The method of claim 9 wherein determining the measurement related to optical density produced by the print head further comprises:

printing a patch for the primary ink at a selected gray level; and measuring the measurement related to optical density associated with the patch printed by the print head.

13. The method of claim 9 wherein the measurement related to optical density includes an L* included in the L*a*b* color space.

14. The method of claim 9 wherein the measurement related to optical density includes a b* included in the L*a*b* color space.

15. The method of claim 9 wherein the selected gray level corresponds to a gray level that the two or more representative print heads print the primary ink at substantially a maximum difference in the optical density related measurements from the two or more print heads.

16. The method of claim 9 wherein estimating the linearization table further comprises:

selecting the two prebuilt linearization tables corresponding to the optical density related measurements greater and less than the optical density related measurement of the print head being calibrated when printing the primary ink at the selected gray level; and interpolating between the two prebuilt linearization tables to generate the linearization table for the primary ink of the print head being calibrated.

17. An apparatus for creating linearization tables used in printer calibration comprising:

a processor;

a memory containing instructions that when executed cause the processor to receive ink drop weight information for a print head in a group of one or more print heads that prints a primary ink, select from the group of print heads at least two print heads that deliver a range of different ink drop weights when printing the primary ink, generate two or more prebuilt linearization tables for each of the at least two print heads that compensates for the different ink drop weights printed by the at least two print heads, wherein two or more prebuilt linearization tables can be interpolated to create a linearization table for a primary ink.

18. An apparatus for calibrating a print head using linearization, comprising:

a processor;

a memory containing instructions that when executed cause the processor to receive two or more prebuilt linearization tables for a corresponding two or more print heads that compensate for the different ink drop weights printed by the print heads, determine an optical density related measurement by the print head under conditions comparable to the printing performed by the two or more print heads when generating the two or more prebuilt linearization tables, compare optical density related measurement produced by the print head with optical density related measurements made from the two or more print heads when generating the corresponding two or more prebuilt linearization tables, estimate the a linearization table for the print head based upon the prebuilt linearization tables for the two or more print heads and the comparison of the optical density related measurement from the print head and the optical density related measurements from the two or more print heads.

19. A computer program product, tangibly stored on a computer-readable medium, for creating linearization tables used in printer calibration, comprising instructions operable to cause a programmable processor to:

receive optical density related information for a print head in a group of one or more print heads that print a primary ink;

select from the group of print heads at least two print heads that deliver a range of different ink drop weights when printing the primary ink;

generate two or more prebuilt linearization tables for each of the at least two print heads that compensates for the different ink drop weights printed by the at least two print heads, wherein two of the prebuilt linearization tables can be interpolated to create a linearization table for a printed by a specific print head.

20. A computer program product, tangibly stored on a computer-readable medium, for calibrating a primary ink using linearization, comprising instructions operable to cause a programmable processor to:

receive two or more prebuilt linearization tables for a corresponding two or more print heads that compensate for different ink drop weights printed by the two or more print heads;

determine a measurement related to optical density when the print head prints the primary ink at a selected gray level;

compare the measurement related to optical density produced by the print head with measurements related to optical density when the two or more print heads print the primary ink at the selected gray level; and estimate the a linearization table for the primary ink based upon the prebuilt linearization tables for the two or more print heads and the comparison of the measurement related to optical density of the print head and the two or more print heads.

21. A printer calibration system comprising:

two or more print heads that deliver a range of different ink drop weights when printing a primary ink;

a prebuilt linearization table generator that creates corresponding prebuilt linearization tables for each of the two or more print heads to compensate for the different ink drop weights printed by the representative print heads;

a printer having a calibration routine that performs a measurement related to optical density of a print head and then uses the measurement related to optical density to interpolate between two of the prebuilt linearization tables and creates an linearization table for a primary ink printed by the print head.

22. The system of claim 21 wherein the printer uses an embedded sensor in the printer to make a measurement related to optical density when the print head prints the primary ink at a selected gray level.

23. The system of claim 18 wherein the selected gray level corresponds to a gray level that the two or more print heads print the primary ink with a maximum difference in optical density.

24. The system of claim 22 wherein the selected gray level corresponds to a gray level that the two or more print heads print the primary ink with a maximum difference in L*.

25. The system of claim 21 wherein the printer further comprises:

comparison logic that compares the measurement related to optical density of the print head with the measurement related to optical density of the two or more print heads to print at the selected gray level; and estimation logic that estimates the linearization table for the primary ink based upon the prebuilt linearization tables for the two or more print heads and the comparison of ink drop weights between the print head and the two or more print heads.

26. The system of claim 21 wherein the prebuilt linearization tables include linearization tables corresponding to a low ink drop weight print head, a nominal ink drop weight print head, and a high ink drop weight print head.

27. An apparatus for creating linearization tables used in printer calibration comprising:

receiving optical density related measurements for a primary ink in a group of one or more print heads printing with the primary ink;

selecting from the group of print heads at least two print heads that deliver a range of optical densities when printing with the one or more primary ink;

generating prebuilt linearization tables corresponding to the at least two print heads that compensate for different ink drop weights printed by the at least two print heads; and providing the prebuilt linearization tables and at least a portion of the optical density related measurements to a calibration routine that interpolates the prebuilt linearization tables to create an actual linearization table for the primary ink printed by a print head.

28. An apparatus for calibrating a primary ink printed by a print head, comprising:

means for receiving two or more prebuilt linearization tables for a corresponding two or more print heads that compensate for different ink drop weights printed by the two or more print heads;

means for determining a measurement related to optical density when the print head prints the primary ink at a selected gray level;

means for comparing the measurement related to optical density produced by the print head with measurements related to optical density when the two or more print heads print the primary ink at the selected gray level; and means for estimating a linearization table for the primary ink based upon the prebuilt linearization tables for the two or more print heads and the comparison of the measurement related to optical density of the print head and the two or more print heads.

29. An apparatus for calibrating a primary ink printed by a print head, comprising:

means for receiving two or more prebuilt linearization tables for a corresponding two or more representative print heads that compensate for the different ink drop weights printed by the representative print heads;

means for determining an ink drop weight when the print head prints the primary ink at a selected gray level;

means for comparing the ink drop weight produced by the print head with the ink drop weight used by the two or more representative print heads to print at the selected gray level; and means for estimating the linearization table for the primary ink based upon the prebuilt linearization tables for the representative print heads and the comparison of ink drop weights between the print head and the representative print heads.

* * * * *